United States Patent
Sylvester

(10) Patent No.: US 6,652,025 B2
(45) Date of Patent: Nov. 25, 2003

(54) BICYCLE SEAT

(76) Inventor: Douglas Lyle Sylvester, Box 1300 Carman, Manitoba (CA), R0G 0J0

( * ) Notice: Subject to any disclaimer, the term of this patent is extended or adjusted under 35 U.S.C. 154(b) by 0 days.

(21) Appl. No.: 10/266,684

(22) Filed: Oct. 9, 2002

(65) Prior Publication Data

US 2003/0067195 A1 Apr. 10, 2003

Related U.S. Application Data

(60) Provisional application No. 60/327,751, filed on Oct. 9, 2001.

(51) Int. Cl.$^7$ ................................ B62J 1/00; B62J 1/02
(52) U.S. Cl. ...................... 297/201; 297/208; 297/312; 297/209
(58) Field of Search ................................ 297/201, 312, 297/208, 202, 209

(56) References Cited

U.S. PATENT DOCUMENTS

| | | | |
|---|---|---|---|
| 531,333 A | | 12/1894 | Rogers |
| 545,224 A | | 8/1895 | Eddy |
| 603,943 A | * | 5/1898 | Clifford ............... 297/201 |
| 606,124 A | * | 6/1898 | Craig ............... 297/200 X |
| 642,191 A | | 1/1900 | Wright |
| 701,390 A | * | 6/1902 | Provoost ............... 297/201 |
| 749,865 A | * | 1/1904 | Jarvis ............... 297/188.09 |
| 4,369,998 A | | 1/1983 | Blase |
| 4,387,925 A | | 6/1983 | Barker et al. |
| 4,512,608 A | | 4/1985 | Erani |
| 5,709,430 A | | 1/1998 | Peters |
| 5,823,618 A | * | 10/1998 | Fox et al. ............... 297/201 |
| 6,068,333 A | | 5/2000 | Dixon |

* cited by examiner

Primary Examiner—Anthony D. Barfield
(74) Attorney, Agent, or Firm—Ryan W. Dupuis; Adrian D. Battison; Michael R. Williams

(57) ABSTRACT

A bicycle seat is provided which is designed to relieve pressure on the perineal area of riders, as well as relieve pressure on the ischial tuberosities, commonly known as the sit bones, of a rider. The seat includes a mount in the form of a pair of parallel and spaced apart mounting members. A pair of support members extend upwardly and rearwardly in relation to the respective mounting members for supporting a pair of annular seat members thereon which support the buttocks of the rider. The support members and seat members supported thereon are movable relative to the mounting members between flexed and unflexed positions. The seat members include a peripheral seating surface about a central opening which suspends the sit bones of the rider therein. The seat is simple in construction, being formed by bent rods of material with padded material injection molded integrally about the rods.

20 Claims, 8 Drawing Sheets

BICYCLE SEAT

This application claims the benefit of Provisional application Ser. No. 60/327,751, filed Oct. 9, 2001.

FIELD OF THE INVENTION

The present invention relates to a seat for securement to a bicycle and more particularly to a bicycle seat of the type having a pair of seat members for supporting the rider of the bicycle thereon.

BACKGROUND

Conventional bicycle seats of the type which are commonly currently employed, are known to cause discomfort and possible damage to the health of riders by placing excess pressure on the soft tissues of the perineal area, including the pelvic area in female riders or the main penile artery in male riders and related nerves of that area. Numerous variations to the design of bicycle seats have been proposed for transferring the weight of the rider to the buttocks the rider. Examples of these are found in the following U.S. Pat. Nos.

| | |
|---|---|
| 531,333 to C. T. Rogers | 545,224 to A. J. Eddy |
| 642,191 to J. S. Wright | 4,369,998 to Blase |
| 4,387,925 to Barker et al | 4,512,608 to Erani |
| 5,709,430 to Peters | 6,068,333 to Dixon |

Among the references noted above however, focusing the weight of the rider on the ischial tuberosities, commonly known as the sit bones, can also cause considerable discomfort during extended use of a bicycle. Furthermore, among the designs proposed by the above noted patents, none provide sufficient ventilation to the buttocks in the area of the sit bones. In each device of the prior patents noted, a complex arrangement of parts is required while little suitable suspension is provided. Many of the prior patents disclose suspension which tilts the seating surfaces excessively forwardly, providing inadequate support to the rider.

SUMMARY

According to one aspect of the present invention there is provided a seat for securement to a bicycle seat mount, the seat comprising:

a pair of mounting members coupled together, parallel and spaced apart from one another, each extending longitudinally from a respective front end to a respective rear end;

a pair of a support members, each coupled at a respective front end to the front end of a respective one of the pair of mounting members and extending upwardly and rearwardly in relation to the mounting member to a respective rear end;

the rear ends of the respective support members being movable relative to the mounting members between an unflexed position spaced above the mounting members and a flexed position in which the rear ends of the respective support members are deflected downwardly in relation to the unflexed position;

a pair of seat members supported on the support members respectively, the pair of seat members being suitably sized for supporting buttocks of a rider thereon; and biasing means biasing the rear ends of the respective support member and the respective seat members supported on support members from the flexed position to the unflexed position.

The use of a pair of seat members for supporting the respective buttocks of the rider thereon relieves the pressure from the perineal area of a rider, to prevent excess pressure on the main penile artery in the subscrotal area of male riders. Also, the pair of seat members provides a broad seating surface which is shorter in a longitudinal direction of the bicycle so as to be more comforting to the wider and more shallow pelvic area of female riders. Suspension of the seat members is provided by downward flexing of the support members which are oriented to extend upwardly and rearwardly such that the seating surfaces do not tilt excessively forwardly under suspension as in the prior art. Providing a downward incline to the seating surfaces also provides relief to pressure on the hamstrings of a rider.

According to a second aspect of the present invention there is provided a seat for securement to a bicycle seat mount, the seat comprising:

a pair of mounting members coupled together, parallel and spaced apart from one another, each extending longitudinally from a respective front end to a respective rear end;

a pair of a support members mounted on the respective mounting members to extend upwardly therefrom; and a pair of seat members supported on the support members respectively spaced above the mounting members, the pair of seat members being suitably sized for supporting buttocks of a rider thereon;

the seat members each including a peripheral seating surface arranged to support a respective one of the buttocks of the rider thereon and a recessed portion surrounded by the seating surface arranged to suspend a respective one of the ischial tuberosities of the rider therein.

Forming the seat members with a peripheral seating surface having a central opening therein permits the sit bone area of the rider to be supported thereon while relieving pressure directly on the ischial tuberosities, more commonly known as the sit bones.

The biasing means may include resilient material coupling the support members to the mounting members or a resilient suspension member coupled between the rear ends of the respective support members and the rear ends of the respective mounting members, or both. There may be provided stop means for limiting deflection of the support members beyond a prescribed spacing from the mounting members in the flexed position.

The seat members preferably span laterally outwardly from respective inner sides supported on the support members respectively to respective outer sides spaced laterally outwardly from the support members respectively. The outer sides of the respective seat members in this arrangement are preferably movable in relation to the support members between respective flexed and unflexed positions of the seat members.

Preferably the seat members are supported on the support members adjacent the respective rear ends of the support members, spaced rearwardly from the respective front ends of the support members.

The seat members may each include a peripheral seating surface arranged to support a respective one of the buttocks of the rider thereon and an opening surrounded by the seating surface arranged to suspend a respective one of the ischial tuberosities of the rider therein. Thus, the seat members may each comprise a generally annular seating surface connected to a respective one of the support members.

Each seat member preferably includes rigid annular member surrounded by padded material having at least one ventilation aperture extending therethrough between respective top and bottom surfaces of the seat member. The padded material may comprise polyurethane foam, injection molded integrally about the rigid annular member.

Preferably the rear ends of the respective support members are coupled to one another for movement together between the flexed and unflexed positions.

Also, each seat member preferably extends at a downward incline from a rear end to a front end thereof in relation to the mounting members to relieve pressure on the hamstrings of the rider.

In one embodiment, the mounting members and the support members are formed of a continuous rod of deformed spring steel having some limited resiliency. The seat members may also comprise a continuous rod of material, which is formed into a pair of annular members for supporting the respective buttocks of the rider thereon.

In an alternative embodiment, the front ends of the support members are pivotally coupled to the mounting members. The biasing means in this instance includes the resilient suspension member coupled between the rear ends of the respective support members and the rear ends of the respective mounting members.

BRIEF DESCRIPTION OF THE DRAWINGS

In the accompanying drawings, which illustrate exemplary embodiments of the present invention.

DETAILED DESCRIPTION

Figure 1:
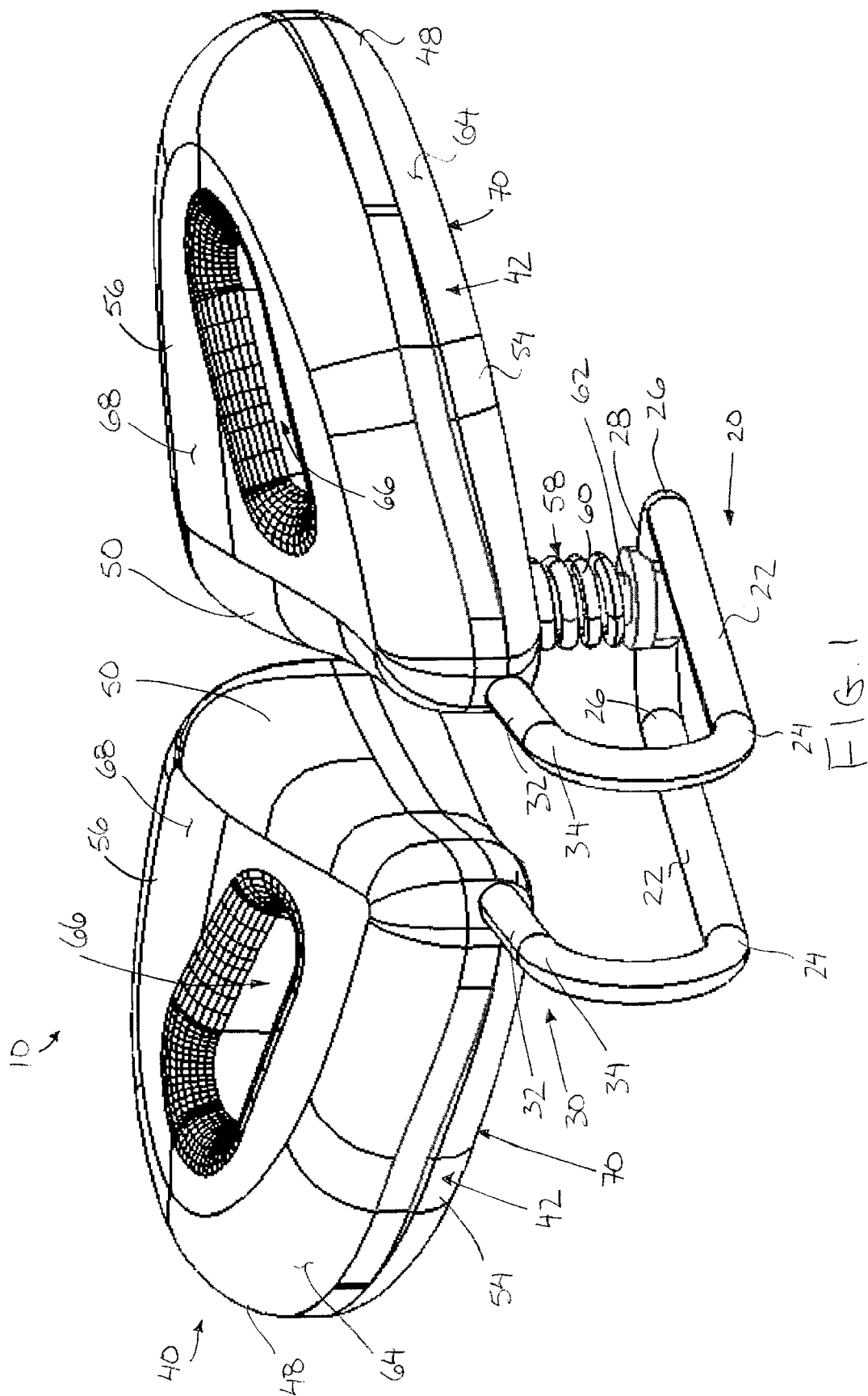
FIG. 1 is an isometric view of a first embodiment of the bicycle seat.
Figure 2:
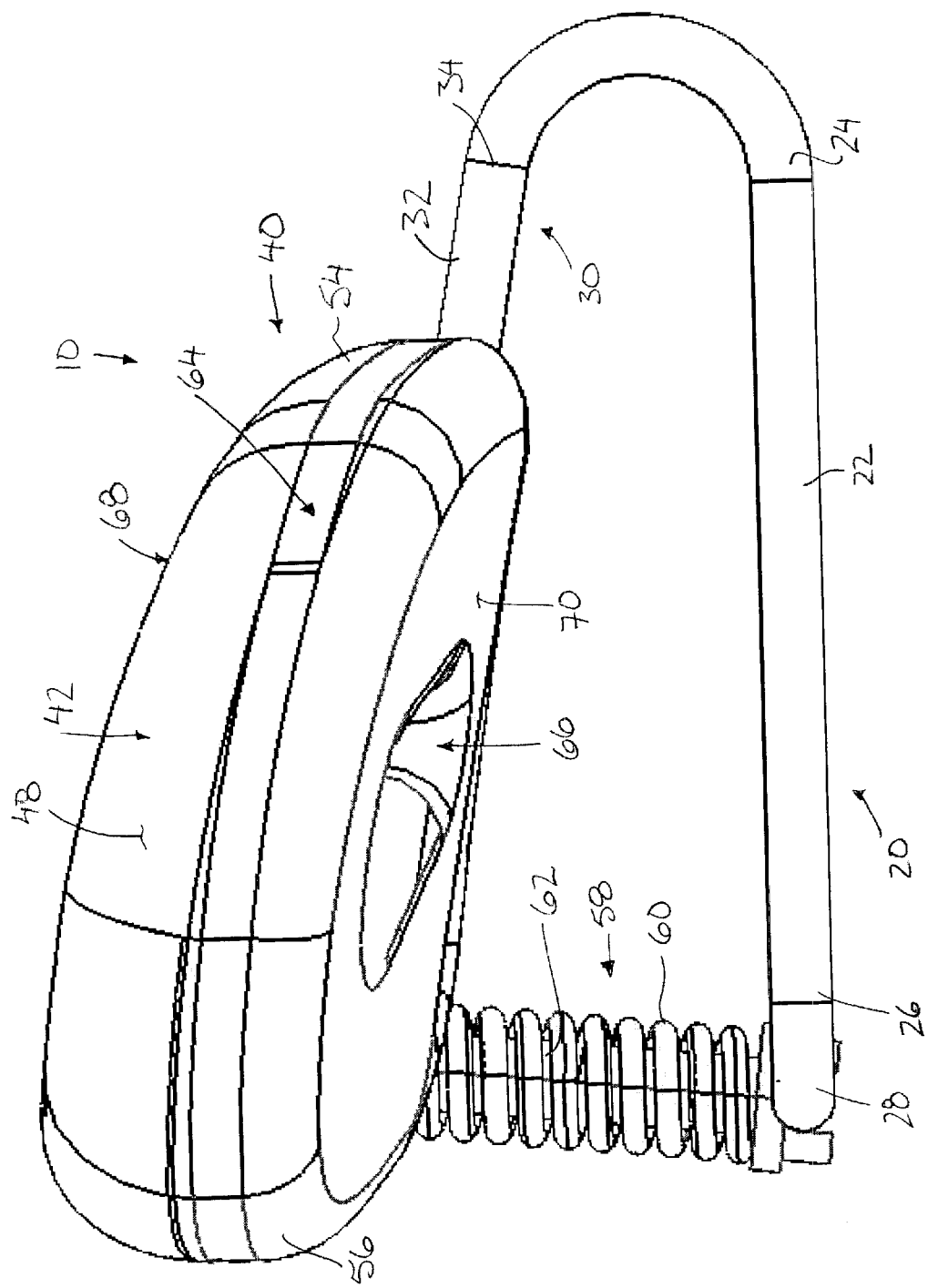
FIG. 2 is a side elevational view of the seat according to FIG. 1.
Figure 3:
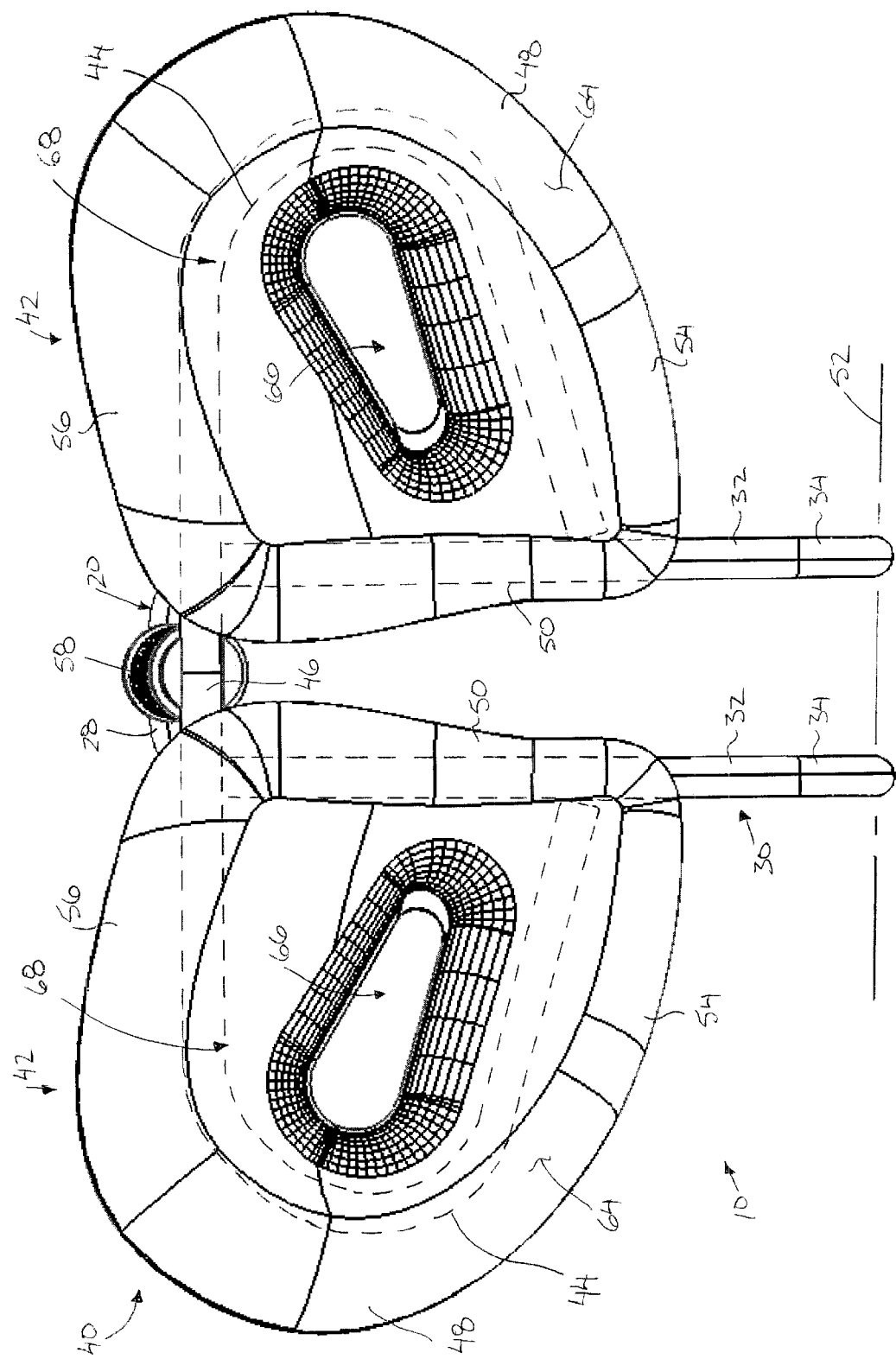
FIG. 3 is a top plan view of the seat according to FIG. 1.
Figure 4:
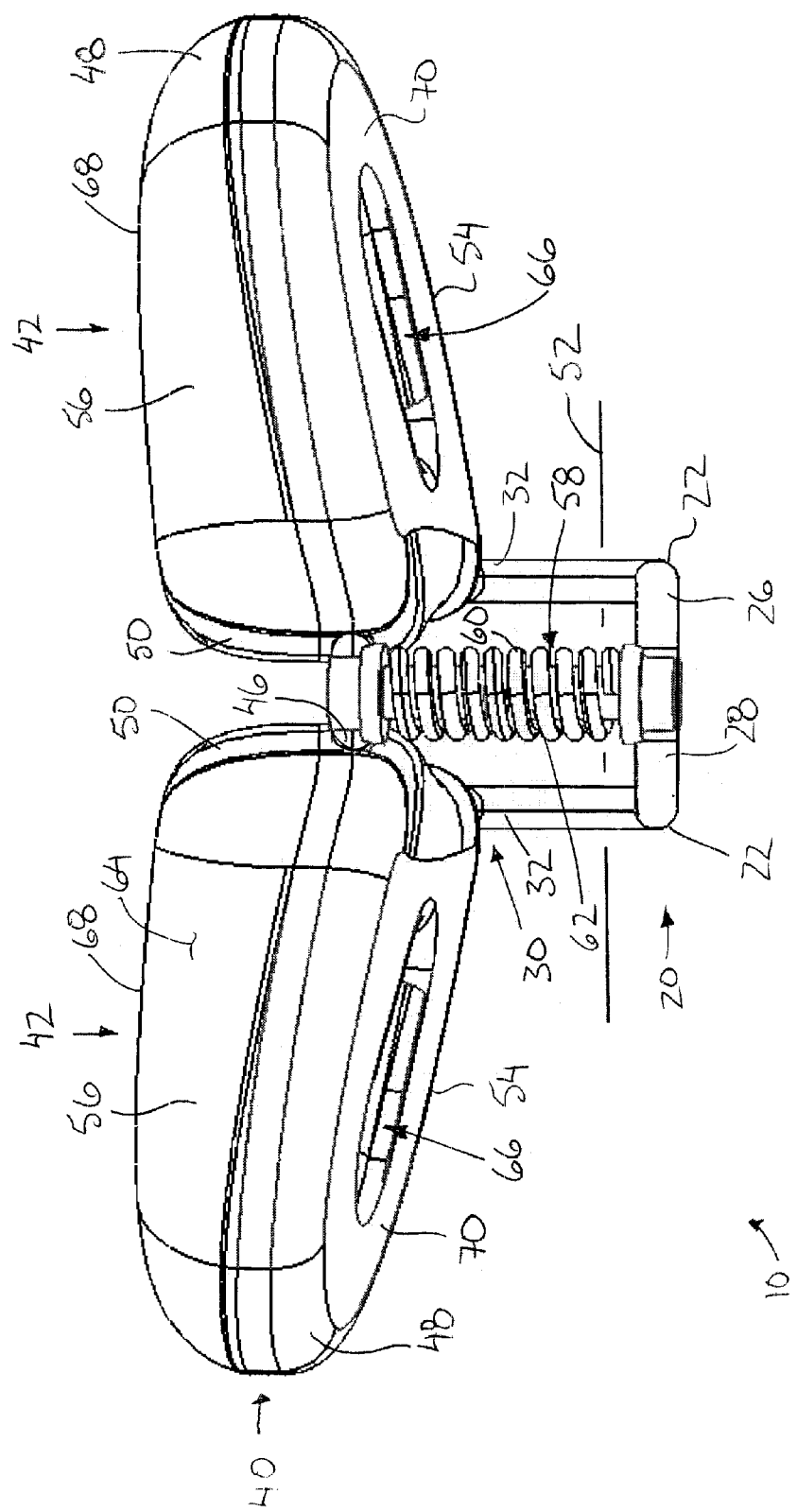
FIG. 4 is a rear elevational view of the seat according to FIG. 1.
Figure 5:
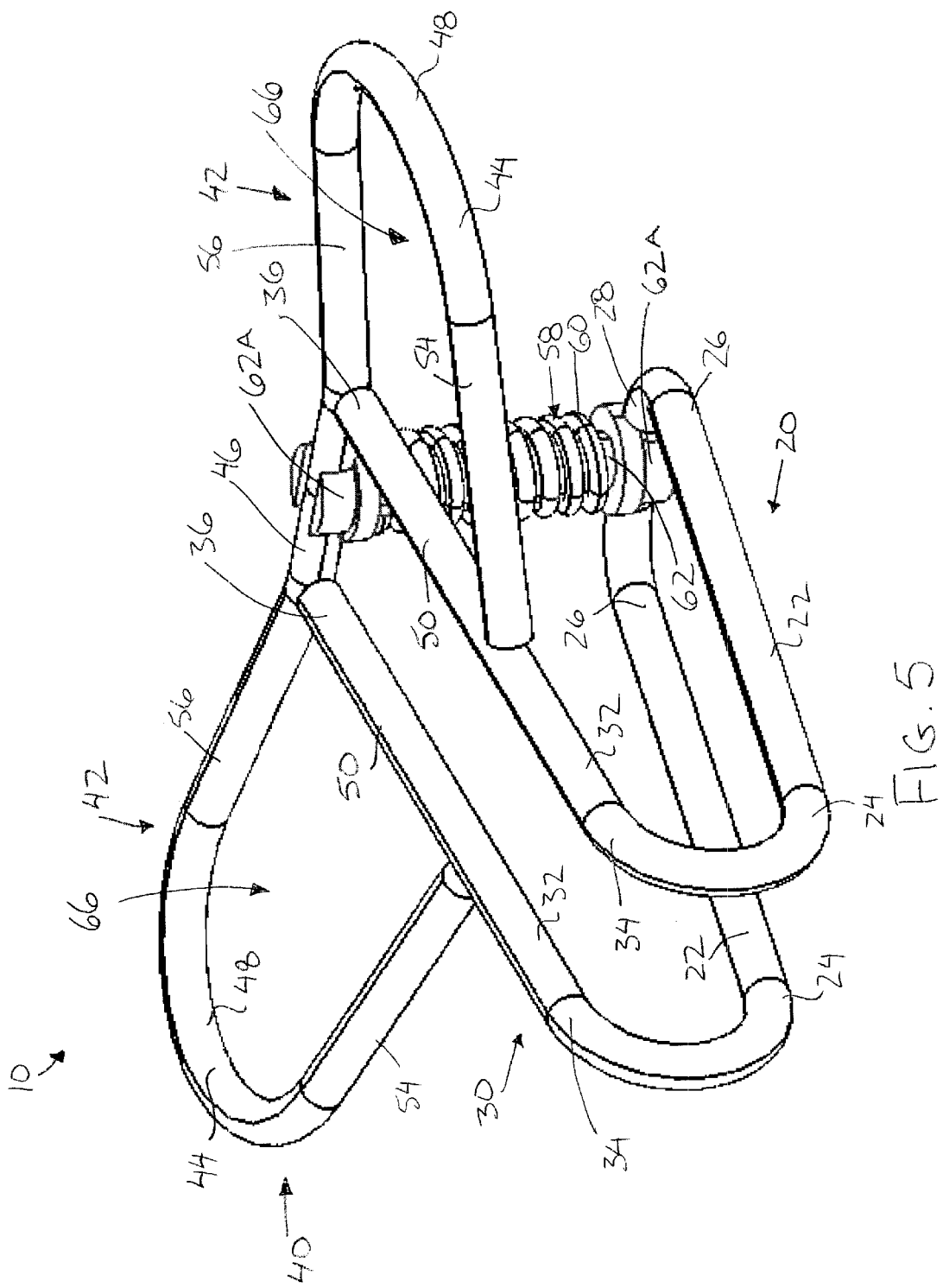
FIG. 5 is an isometric view of the seat frame of the bicycle seat according to FIG. 1 with the padded material not shown.

Referring to the accompanying drawings there is illustrated a seat for a bicycle generally indicated by reference numeral 10. The seat is particularly useful for mounting on a conventional bicycle mount for the purposes of relieving pressure on the perineal or pelvic area and sit bone area of a rider in use.

As shown in the accompanying figures, various embodiments are illustrated, however the common elements will first be described herein.

The seat is arranged for mounting to a conventional seat mount of the type having a pair of laterally spaced apart channels oriented in the longitudinal direction of travel of the bicycle on opposing sides of the seat post of the bicycle. Each channel is arranged to clamp a respective mounting rod of a bicycle seat therein for securement in a conventional bolting configuration. As in conventional seats, the seat can be positioned longitudinally on the bicycle by sliding within the channels of the seat mount.

The seat 10 as described and illustrated herein, includes a mounting portion 20 including two mounting members 22 which are supported parallel and spaced apart from one another. Each mounting member 22 extends in a longitudinal direction from a front end 24 to a rear end 26.

The rear ends 26 are connected by a cross bar 28 spanning laterally therebetween. As illustrated in the embodiments herein, the crossbar 28 is formed integrally with the mounting members 22 from a single rod of material which is bent in a generally U-shaped configuration.

The seat 10 further includes a suspended portion 30 including two support members 32 which are mounted parallel and spaced apart from one another similarly to the mounting members 22. Each support member 32 includes a front end 34 coupled to a respective one of the front ends 24 of the mounting members and extends upwardly and rearwardly therefrom to a rear end 36 spaced rearwardly above the rear end 26 of the respective mounting member 22. The rear end 36 of each support member 32 is movable relative to the respective mounting member 22 between an unflexed position spaced above the mounting member and a flexed position also spaced above the mounting member 22 but deflected downwardly in relation to the unflexed position at a less steep upward and rearward incline. The seat is normally biased to the unflexed position.

The seat 10 further includes a seat portion 40 for supporting the buttocks of the rider thereon. The seat portion includes a pair of seat members 42 mounted on the support member 32 respectively. The seat portion 40 is formed of a single rod of spring steel which is shaped to form a pair of annular structural members 44 of substantially rigid, yet somewhat resilient construction. The rod forming the seat members includes a cross bar 46 coupled between the support members 32 to cause the support members to move and be deflected together between the flexed and unflexed positions.

In addition to the cross bar 46, the single rod of the seat portion also forms the annular structural members 44 by defining a pair of opposed U-shaped wings of steel rod which project laterally outwardly to respective curved outer ends 48 so as to be welded at respective inner free ends 50 on the respective support members 32. The annular structural members 44 are secured to the support members adjacent the rear ends of both members 44 and 32 so that the front ends 54 of the seat members 42 are spaced rearwardly from the front ends of the support members. Accordingly the seat members 42 are spaced rearwardly from a laterally extending pivot axis 52, extending horizontally through respective front ends of the mounting members and support members, about which the seat members are generally pivoted between the flexed and unflexed positions.

Forming the seat members 42 from spring steel rods further allows some twisting of the seat members about a laterally extending horizontal axis extending through the seat members so that a front 54 of each seat member is flexible relative to a rear 56 thereof due to the twisting action of the seat members about this axis. Further flexing is permitted at the outer ends 48 of each seat member relative to the inner ends 50.

In this arrangement each seat member spans laterally outwardly from the inner side supported on the support members to the outer sides spaced laterally outwardly from the support member to permit the outer sides to be freely suspended for flexing between an unflexed position in which the seat members extend laterally outwardly at a slight upward incline and a flexed position when force is applied onto the surface of the seat members so that the seat members extend substantially horizontally or at a slight downward incline and the outer ends 48 are spaced lower than in the unflexed positions. Accordingly the seat members are also somewhat flexible about a central longitudinally extending horizontal axis generally between the support members.

A suspension member 58 is coupled between the cross bar 46 of the seat portion 40 and the cross bar 28 of the mounting portion. The suspension member includes a coil spring 60 and a slide member 62 extending through the spring so as to bias the rear ends of the support members upwardly into the unflexed position.

The slide member 62 includes a pair of opposed mounts 62A which mount the slide member on the cross bars 46 and 28 respectively. The mounts 62A are slidably mounted relative to one another on opposing ends of a slide pin 62B. The coil spring 60 is coupled between the mounts 62A to bias the mounts in a sliding motion along the slide pin 62B away from one another. The slide pin 62B acts as a guide to ensure that movement of the support members and seat members thereon, relative to the mounting members between the flexed and unflexed positions, acts primarily in a linear direction along an axis of the slide pin.

In the unflexed position, the mounts 62A are spaced apart in the order of ¼ of an inch from one another along the slide pin 62B. The mounts 62A are arranged to slidably engage each other along the slide pin 62B as the seat members are displaced towards the flexed position, such that the mounts act as stops relative to one another to prevent further sliding movement of the mounts 62A towards one another beyond a distance prescribed by the spacing between the mounts in the unflexed position. The configuration of the mounts on the slide pin as described herein, limits the amount of flexing of the support members relative to the mounting members to prevent excessive stress on the support members, particularly in the first embodiment described in further detail below.

Padding 64 is provided in the form of polyurethane foam which is integrally inject molded about the rod forming the seat members 42 as well as a rearward portion of the respective support members 32 upon which the seat members are mounted. The annular structural members 44 formed by the seat portion are thus surrounded by an annular shaped cushion formed by foam to define a central opening 66 within each seat member. The central opening has a generally teardrop shape in the form of a slot extending in a generally lateral direction which is wider at an outer side than an inner side. The central opening 66 defines a ventilation aperture communicating between the top seating surface 68 and the bottom surface 70 of each seat member. The aperture formed by the central opening 66, in addition to providing ventilation, defines a peripheral seating surface surrounding the central opening which permits the seat members to surround and suspend the respective sit bones of the rider therein.

Turning now to the first embodiment of FIGS. 1 through 5, further suspension is provided by integrally forming the support members with the respective mounting members 32 and 22 using a single rod of spring steel which is suitably deformed to define a pair of support members extending at an upward and rearward incline relative to a pair of mounting members which are parallel to one another. The section of rod is curved between the front ends of the respective support members and mounting members and is sufficiently resilient to permit some limited flexing from the unflexed position to the flexed position while being biased to return to the unflexed position. In this configuration the support members and the mounting members along with the cross bar 28 coupled therebetween can be formed of a single rod of material which is connected to the single rod forming the seat members 42 so that the seat 10 may be simply constructed using only two sections of rod which have been bent and formed to the desired shape. In the first embodiment suspension of the seat members is thus provided by both the resilient material coupling the support members to the mounting members and the suspension member 58 connected between the rear ends of the members.

Figure 6:
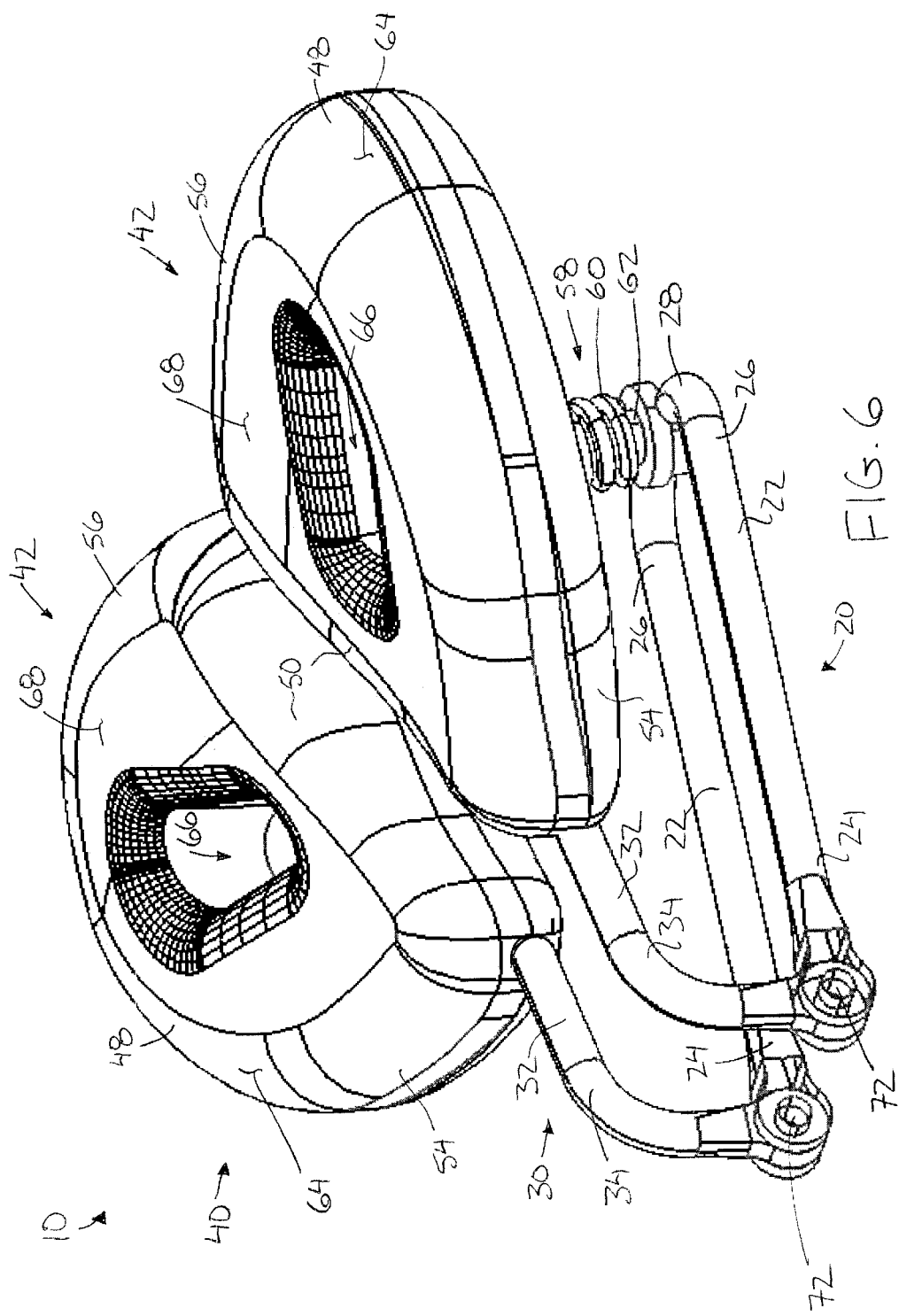
FIGS. 6 and 7 are isometric views of a second embodiment of the bicycle shown after and before injection molding of the padded seat members respectively.
Figure 7:
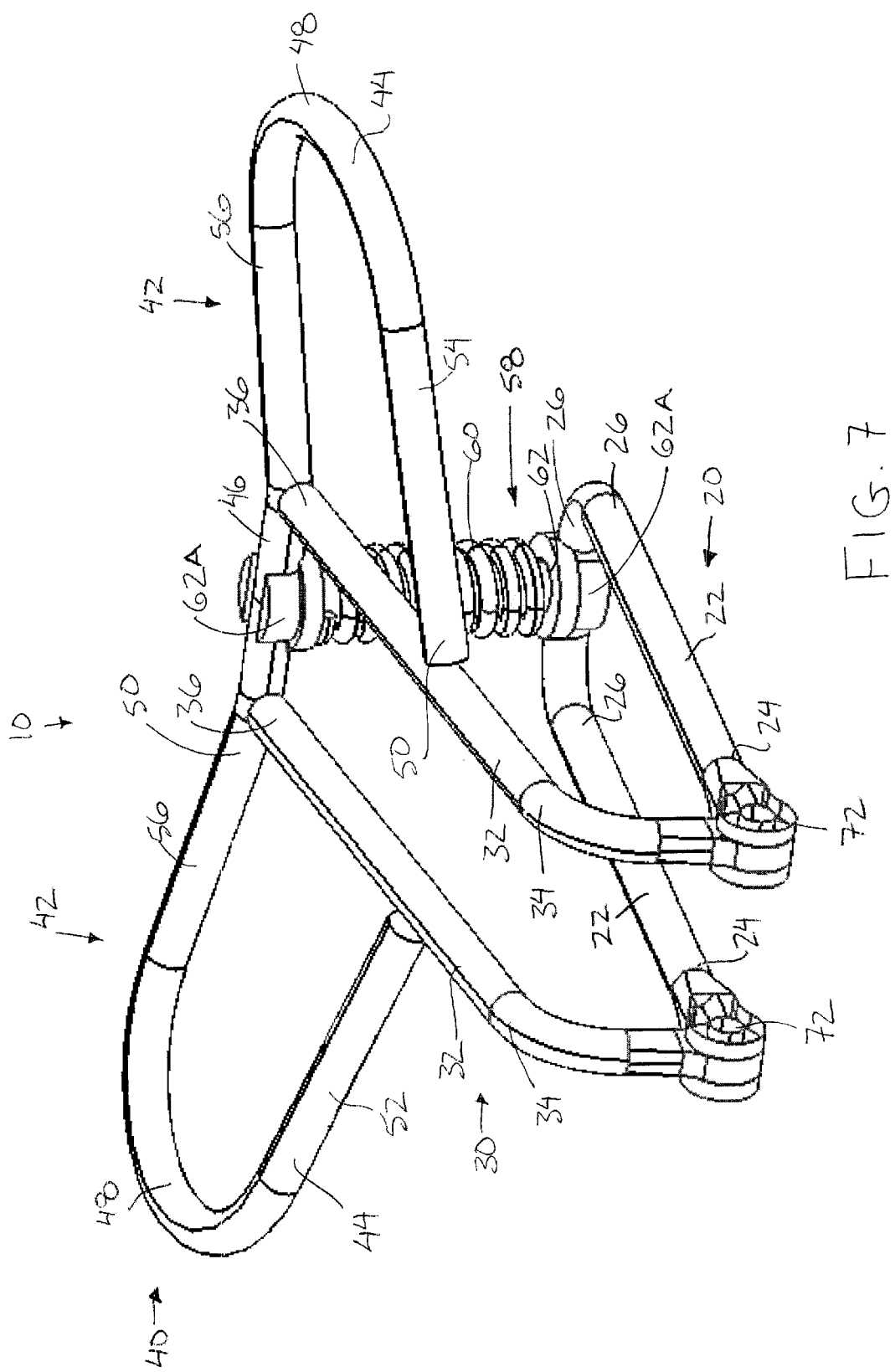
Figure 8:
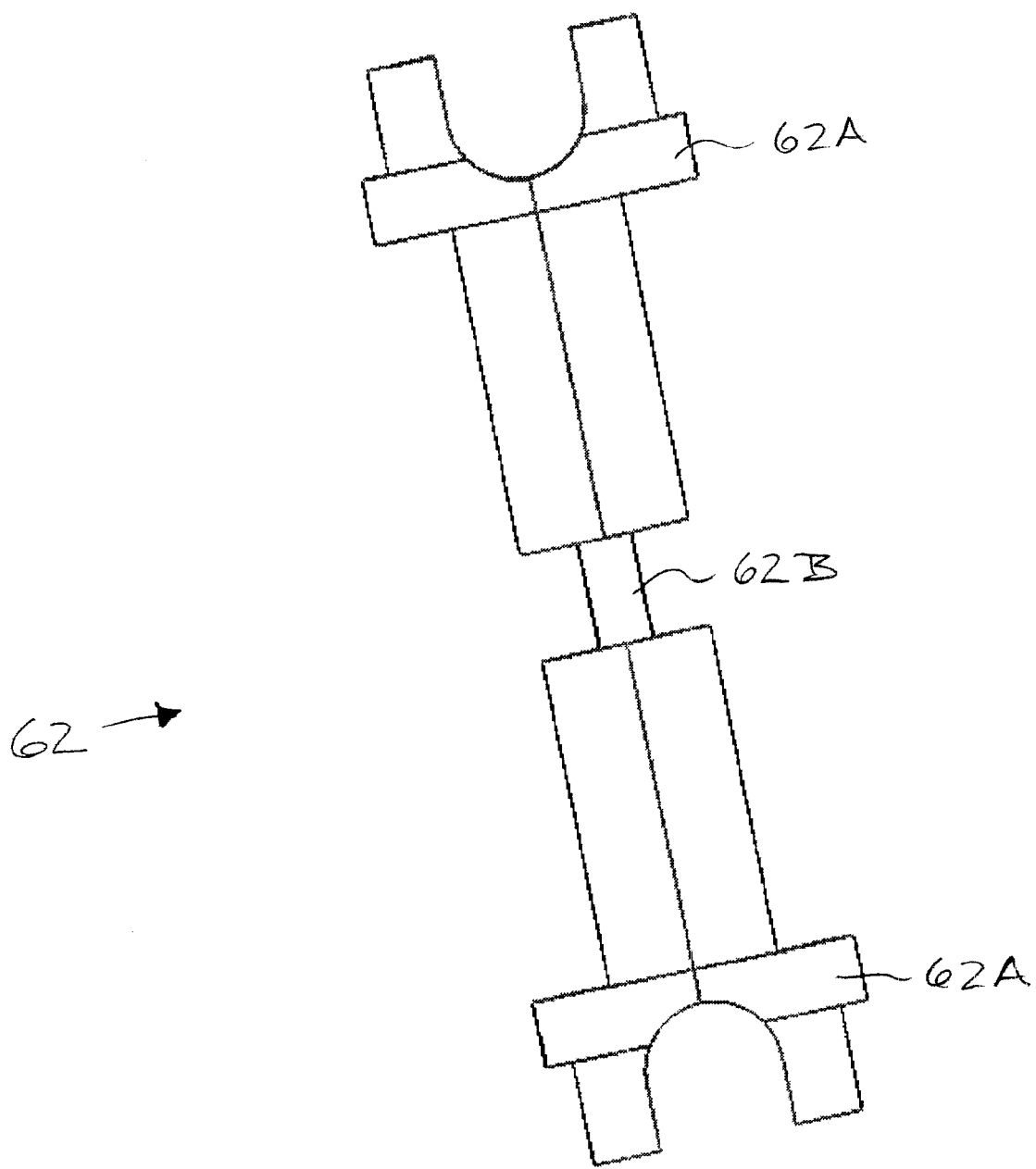
FIG. 8 is an elevational view of the slide component of the suspension member according to either embodiment of the present invention.

Turning now to FIGS. 6 and 7, the second embodiment of the seat 10 will now be described in further detail. In the second embodiment the mounting members include respective hinges 72 at the front ends thereof which pivotally mount the respective support members thereon to similarly extend upwardly and rearwardly in relation to the mounting members for general pivoting movement about the axis 52 between respective flexed and unflexed positions. In this configuration all of the suspension and biasing of the seat from the unflexed position to the flexed position is provided by the suspension member 58. Otherwise the second embodiment of the seat 10 operates and flexes similarly to that of the first embodiment.

In all embodiments of the seat 10, the seat portion 40 defines a pair of annular upper seating surfaces forming a periphery about a respective central opening within which a respective one of the sit bones of the rider is suspended in use. Furthermore, the seat members, including the padding integrally molded thereon, remain spaced apart from one another to avoid placing any pressure on the perineal area of the rider. The front sides of the seat members are further arranged to be lower and closer in relation to the mounting members than the rear sides so that the upper seating surfaces of the seat members extend at a downward and forward incline to reduce any unnecessary pressure on the hamstrings of the rider.

The construction of either embodiment of the seat described herein also provides multiple degrees of suspension including pivoting and twisting action about multiple axes. The amount of movement permitted of the seat is dependent upon the rigidity or resiliency of the metal rod used to form the annular structural members 44 of the seat portion as well as the support and mounting members. The majority of the suspension of the seat members is provided by either the suspension member 58 or the resilient coupling of the front ends of the support members on the mounting members, however in either embodiment the seat members remain movable in a generally upward and downward direction so as to be generally pivotal about a laterally extending axis 52 extending through respective front ends of the support and mounting members. The pedalling action of the rider, in which the legs of the rider are alternately lowered and raised, causes the seat members to be displaced independently of one another by twisting action about the laterally extending axis through the seat members so that the front ends of each seat member is movable upwardly and downwardly in relation to the rear ends of the seat members while always maintaining a generally upward and rearward incline of the upper seating surfaces thereof. Suspension is finally provided by permitting the outer free ends of the seat members to be flexed upwardly and downwardly in relation to the inner ends secured on the support members to provide some additional comfort to the natural side to side rocking motion of the rider while pedalling.

As noted above, the seating surface is provided by two molded integral skin polyurethane foam cushions. The cushions are integrally molded around a three dimensional steel support structure formed of rod material. The cushions remain separated by a gap or space centrally located on the seat which prevents the seat from putting pressure on a male rider's main penile artery. The area of the seat cushions which contact a rider's buttocks are shaped such that these cushions provide a comfortable and relatively even pressure distribution across the contact area. The cushion shape is also designed to minimize shear between the seat surface and the rider's buttocks. The central region of each seat cushion includes the elongated teardrop-shaped hole which provides ventilation to prevent heat and moisture build up on the rider's buttocks. This hole also helps to relieve pressure on the rider's ischial tuberosities. The three dimensional steel support structure inside of the cushion is designed to cradle the ischial tuberosities and thereby reduce pressure on them as well.

In further embodiments, additional suspension may be provided by anchoring the seat members 42 to the support members only at the rear sides thereof on the rear ends of the support members so that the seat members project forwardly to respective forward free ends suspended spaced above the support members. The front free ends of the seat members in this instance would be permitted to readily deflect upwardly and downwardly in relation to the rear ends by twisting action of the rear ends anchored to the rear ends of the support members.

Also in further embodiments each seat member and its respective support member upon which it is mounted may be unconnected and freely movable relative to the opposed seat member and its respective support member upon which it is mounted. By not connecting the support members directly to one another at respective rear ends thereof, the seat members are even more freely movable relative to one another.

Also in further embodiments the seat cushions which are integrally molded about the rod forming the annular structural members 44, may be molded as a continuous pad which fills the central opening of the annular structural members such that the opening comprises only a recess in the upper seating surface of the seat cushions. The majority of the support even when a continuous upper seating surface is provided, is still mainly provided by the rigid internal support structure which is annular-shaped for cradling and surrounding the sit bones of the rider to relieve pressure thereon. The seat cushions may also be molded separately from the wire frame structure of the seat, for subsequent mounting on the wire frame. The seat cushions in this instance would include a suitable slotted configuration for receiving the annular structural members 44 slidably therein.

While various embodiments of the present invention have been described in the foregoing, it is to be understood that other embodiments are possible within the scope of the invention. The invention is to be considered limited solely by the scope of the appended claims.

What is claimed is:

1. A seat for securement to a bicycle seat mount, the seat comprising:

a pair of mounting members coupled together, parallel and spaced apart from one another, each extending longitudinally from a respective front end to a respective rear end;

a pair of a support members, each resiliently formed integrally at a respective front end with the front end of a respective one of the pair of mounting members and extending upwardly and rearwardly in relation to the mounting member to a respective rear end;

the rear ends of the respective support members being movable relative to the mounting members between an unflexed position spaced above the mounting members and a flexed position in which the rear ends of the respective support members are deflected downwardly in relation to the unflexed position;

a pair of seat members supported on the support members respectively such that rear ends of the seat members are supported at the rear ends of the support members, the pair of seat members being suitably sized for supporting buttocks of a rider thereon; and biasing means biasing the rear ends of the respective support member and the respective seat members supported on support members from the flexed position to the unflexed position.

2. The seat according to claim 1 wherein the biasing means includes a resilient suspension member coupled between the rear ends of the respective support members and the rear ends of the respective mounting members.

3. The seat according to claim 1 wherein the seat members span laterally outwardly from respective inner sides supported on the support members respectively to respective outer sides spaced laterally outwardly from the support members respectively and wherein the outer sides of the respective seat members are movable in relation to the support members between respective flexed and unflexed positions of the seat members.

4. The seat according to claim 1 wherein the seat members each include a peripheral seating surface arranged to support a respective one of the buttocks of the rider thereon and an opening surrounded by the seating surface arranged to suspend a respective one of the ischial tuberosities of the rider therein.

5. The seat according to claim 1 wherein each seat member comprises a padded member having at least one ventilation opening extending therethrough between respective top and bottom surfaces of the seat member.

6. The seat according to claim 1 wherein the rear ends of the respective support members are coupled to one another for movement together between the flexed and unflexed positions.

7. The seat according to claim 1 wherein each seat member extends at a downward incline from a rear end to a front end thereof in relation to the mounting members.

8. A seat for securement to a bicycle seat mount, the seat comprising:

a pair of mounting members coupled together, parallel and spaced apart from one another, each extending longitudinally from a respective front end to a respective rear end;

a pair of a support members, each resiliently formed integrally at a respective front end with the front end of a respective one of the pair of mounting member and extending upwardly and rearwardly in relation to the mounting member to a respective rear end;

the rear ends of the respective support members being movable relative to the mounting members between an unflexed position spaced above the mounting members and a flexed position in which the rear ends of the respective support members are deflected downwardly in relation to the unflexed position;

a pair of seat members supported on the support members respectively such that rear ends of the seat members are supported at the rear ends of the support members, the pair of seat members being suitably sized for supporting buttocks of a rider thereon; and biasing means biasing the rear ends of the respective support member and the respective seat members supported on support members from the flexed position to the unflexed position;

the biasing means including a resilient suspension member coupled between the rear ends of the support members and the rear ends of the mounting members.

9. The seat according to claim 8 wherein there is provided stop means for limiting deflection of the support members beyond a prescribed spacing from the mounting members in the flexed position.

10. A seat for securement to a bicycle seat mount, the seat comprising:

a pair of mounting members coupled together, parallel and spaced apart from one another, each extending longitudinally from a respective front end to a respective rear end;

a pair of a support members, each coupled at a respective front end to the front end of a respective one of the pair of mounting members and extending upwardly and rearwardly in relation to the mounting member to a respective rear end;

the rear ends of the respective support members being movable relative to the mounting members between an unflexed position spaced above the mounting members and a flexed position in which the rear ends of the respective support members are deflected downwardly in relation to the unflexed position;

a pair of seat members supported on the support members respectively, the pair of seat members being suitably sized for supporting buttocks of a rider thereon;

biasing means biasing the rear ends of the respective support member and the respective seat members supported on support members from the flexed position to the unflexed position; and stop means for limiting deflection of the support members beyond a prescribed spacing from the mounting members in the flexed position.

11. The seat according to claim 10 wherein the mounting members and the support members are formed of a continuous rod of material having some limited resiliency.

12. The seat according to claim 11 wherein the continuous rod of material comprises a deformed rod of spring steel.

13. The seat according to claim 11 wherein the seat members comprise a continuous rod of material formed into a pair of annular members for supporting the respective buttocks of the rider thereon.

14. The seat according to claim 10 wherein the front ends of the support members are pivotally coupled to the mounting members.

15. The seat according to claim 14 wherein the biasing means includes a resilient suspension member coupled between the rear ends of the respective support members and the rear ends of the respective mounting members.

16. A seat for securement to a bicycle seat mount, the seat comprising:

a pair of mounting members coupled together, parallel and spaced apart from one another, each extending longitudinally from a respective front end to a respective rear end;

a pair of a support members mounted on the respective mounting members to extend upwardly therefrom; and a pair of seat members supported on the support members respectively spaced above the mounting members, the pair of seat members being suitably sized for supporting buttocks of a rider thereon;

the seat members each including a peripheral seating surface arranged to support a respective one of the buttocks of the rider thereon and a ventilation opening at least partially surrounded by the peripheral seating surface arranged to suspend a respective one of the ischial tuberosities of the rider therein;

each ventilation opening extending through the respective seat member between respective top and bottom surfaces of the seat member.

17. The seat according to claim 16 wherein the seat members each comprise a generally annular seating surface connected to a respective one of the support members.

18. The seat according to claim 16 wherein each seat member includes a rigid annular member surrounded by padded material.

19. The seat according to claim 18 wherein the padded material comprises injection molded foam.

20. The seat according to claim 19 wherein the padded material is integrally molded about the rigid annular member.

* * * * *